United States Patent [19]

Curti

[11] 4,349,097

[45] Sep. 14, 1982

[54] LOADING AND UNLOADING DEVICE TO BE INSTALLED BETWEEN TWO CONSECUTIVE MACHINES

[76] Inventor: Ezio Curti, Via le Regina Giovanna 38, Milano, Italy

[21] Appl. No.: 262,642

[22] Filed: May 11, 1981

Related U.S. Application Data

[63] Continuation of Ser. No. 44,188, May 31, 1979, abandoned.

[30] Foreign Application Priority Data

Jun. 2, 1978 [IT]  Italy ................................ 24148 A/78

[51] Int. Cl.³ ............................................ B65G 37/00
[52] U.S. Cl. .................................... 198/369; 198/436; 198/448; 198/485; 198/574; 198/586; 198/631
[58] Field of Search ................ 198/339, 369, 436, 448, 198/485, 487, 488, 574, 586, 634, 631

[56] References Cited

U.S. PATENT DOCUMENTS

| | | | |
|---|---|---|---|
| 3,522,942 | 8/1970 | Hepp | 198/631 |
| 4,014,428 | 3/1977 | Ossbahr | 198/586 |
| 4,055,245 | 10/1977 | Sundberg | 198/485 |
| 4,172,512 | 10/1979 | Clegg et al. | 198/399 |

FOREIGN PATENT DOCUMENTS

| | | | |
|---|---|---|---|
| 2622772 | 11/1977 | Fed. Rep. of Germany | 198/339 |
| 1386626 | 3/1975 | United Kingdom | 198/485 |

*Primary Examiner*—Joseph E. Valenza
*Attorney, Agent, or Firm*—William F. Frank

[57] ABSTRACT

A loading and unloading device to be installed between two consecutive machines, in which a known unloading device, adjustable in height, interlinked with the outlet of the first working machine and a second known loading device interlinked with the inlet of the second working machine are linked by a moveable trolley arranged between the said two machines with the said trolley carrying a horizontal rotating platform supporting a pair of parallel conveyor belts which can be connected to the unloading device of the first machine and to the loading device of the second machine or else to a loading, and respectively unloading means provided between the two machines.

8 Claims, 4 Drawing Figures

LOADING AND UNLOADING DEVICE TO BE INSTALLED BETWEEN TWO CONSECUTIVE MACHINES

This is a continuation of application Ser. No. 044,188 filed May 31, 1979 now abandoned.

BACKGROUND OF THE INVENTION

This invention relates to a loading and unloading device to be provided between two consecutive machines.

It is known for example that supporting plates for printed circuits must be unloaded from a first machine, for example a machine for silk-screen printing or the like, to be supplied to a second working machine downstream of the first one. These loading and unloading operations are normally made by hand using a trolley for removing the pile of plates discharged from the first machine and transport this pile to the feeder of the second machine. It is obvious that there exists a possibility of the plates for the printed circuits becoming damaged during the transport.

SUMMARY OF THE INVENTION

It is the object of this invention to remedy the drawbacks inherent in the state of art and deriving from the manual handling of the plates for the printed circuits by consenting the automatic transport of the pile of plates from a first to a second machine and consenting still further the unloading respectively the loading of the pile of plates from and to the said working machines. This object is attained according to this invention by inserting between a known discharging device, movable in height and interlinked with the outlet of the first working machine and a second known charging device interlinked with the inlet of the second working machine, a moveable trolley between the two machines, with the said trolley rotatingly supporting a horizontal platform carrying in turn a pair of parallel conveyor belts which may be connected to the discharging device of the first machine and to the charging device of the second machine, as well as loading and unloading means interposed between the two machines.

Using the loading and unloading device possessing these properties, it is possible to connect operationally two machines, for example two machines for silk-screen printing used for the making of supporting plates of printed circuits, automatically feeding the said supporting plates arranged in the form of a pile from the first to the second machine by respectively unloading and loading the said plates between the two machines.

Further advantages and properties of this invention can be taken from the following description, claims and accompanying drawings.

BRIEF DESCRIPTION OF THE DRAWINGS

The object conceived according to this invention shall now be described more in detail according to an embodiment given only by way of example and on hand of the accompanying drawings in which.

DESCRIPTION OF THE PREFERRED EMBODIMENT

Figure 1:
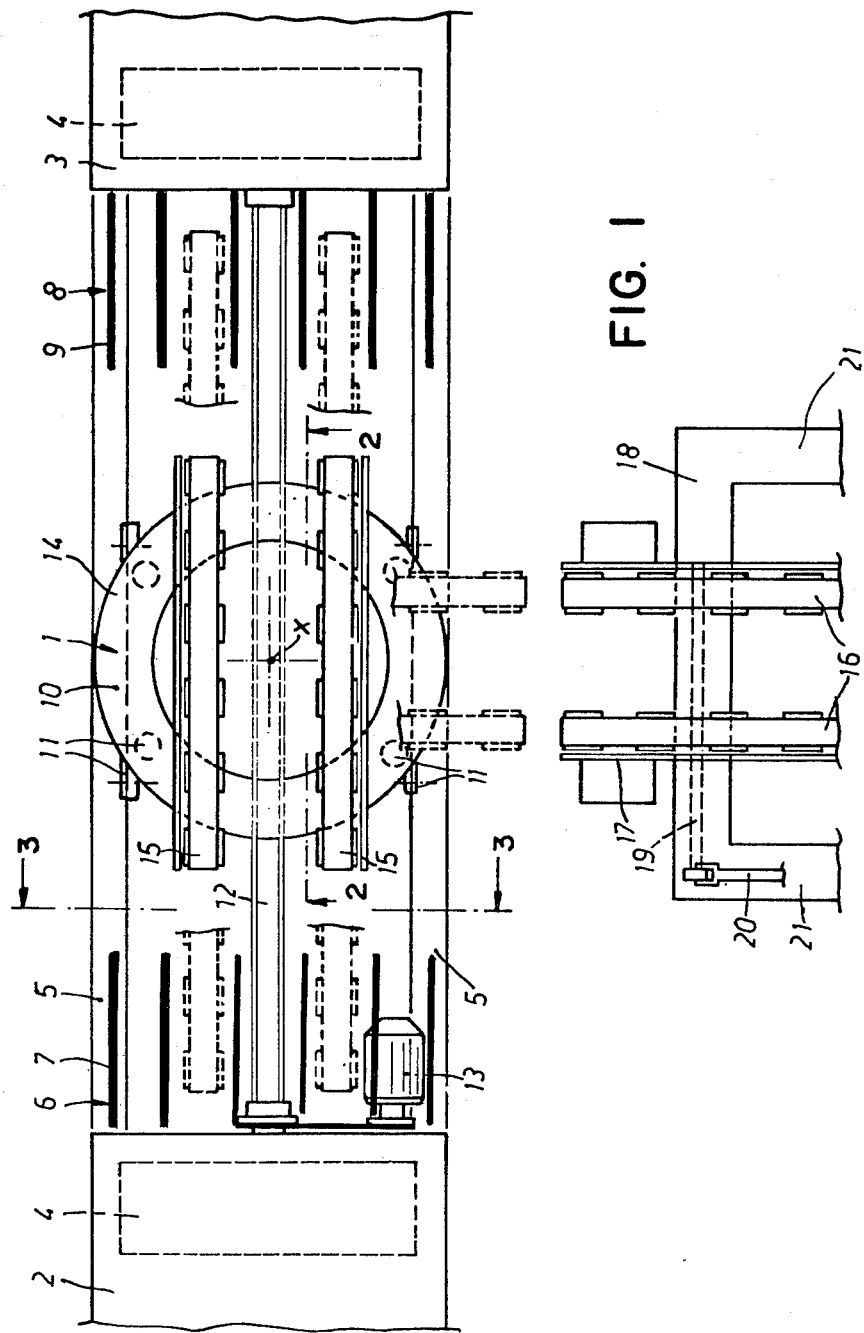
FIG. 1 is a schematic plan view of the loading and unloading device arranged between two machines.

As shown in FIG. 1, the loading and unloading device indicated in general by 1, is arranged between two machines 2, 3, for example machines for silk-screen printing of the plates 4 for printed circuits. The machines 2, 3 are connected by a longitudinal rail 5, with the outlet of the machine 2 being provided by an unloading device 6 consisting of a plurality of arms 7, which are horizontal, parallel and capable to move up and down.

To the input of the machine 3 is linked a loading device 8 consisting by a plurality of horizontal, parallel arms 9 capable to move up and down. Both the unloading device 6 and the loading device 8 are designed to receive in known manner a pile consisting of plate-shaped pieces placed one on the other. The loading respectively unloading device 1 consists of trolley 10 complete with wheels 11 running on the rails 5.

The trolley 10 engages a threaded rod 12 which can be driven and rotated by a reversible motor 13 so as to move the trolley 10 along the rails 5. The trolley 10 supports in addition a platform 14 which can be rotated about the vertical axis x. On the platform 14 is provided in addition a pair of conveyor belts 15 in parallel, controllable by a motor not shown in detail. The spacing between the conveyor belts 15 is chosen in such a manner that it allows the said belts 15 to penetrate into the free spaces formed between the corrsponding arms 7 of the unloading device 6 respectively arms 9 of the loading device 8.

Figure 2:
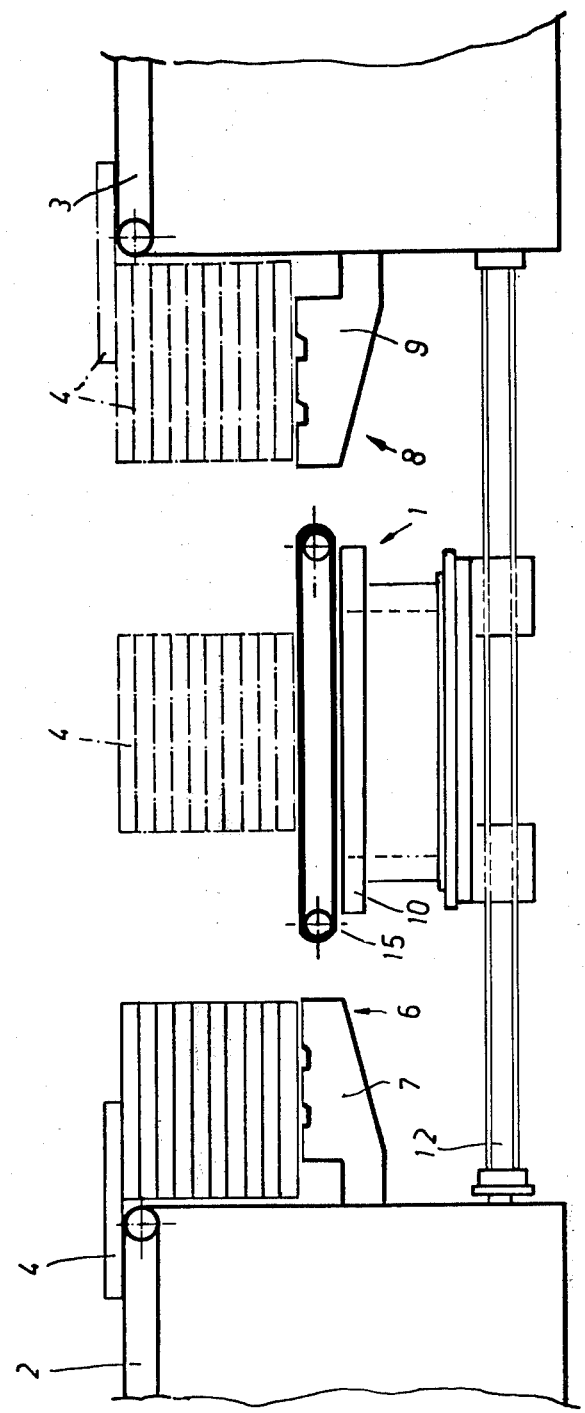
FIG. 2 shows the device according to FIG. 1 in cross-section made along the line II—II of FIG. 1.

Perpendicular to the rails 5, there is between the two machines 2, 3 a further pair of conveyor belts 16 again controlled by a reversible motor not shown and sustained by supports 17 part of a frame 18. To the supports 17 is interlinked a lever system 19 controlled by the rod 20 of a pneumatic piston or the like, for displacing the pair of conveyor belts 16 in height. The frame 18 is preferably U-shaped to allow to introduce between the arms 21 a trolley (not shown) for removing or depositing a pile of plate-shaped pieces 4 on the pair of belts 16. When it is desired to unload on the belts 16 the plate-shaped pieces 4 arriving from the machine 2 or to load a pile of plates 4 deposited on the belts 16 onto the pair of belts 15, the latter must alignand parallel to the belts 16. For this purpose the platform 14 shall be rotated through 90° for carrying the belts 15 from the position shown in FIG. 1 to the position schematically shown in FIG. 2 outlined in dots and dashes.

Figure 3:
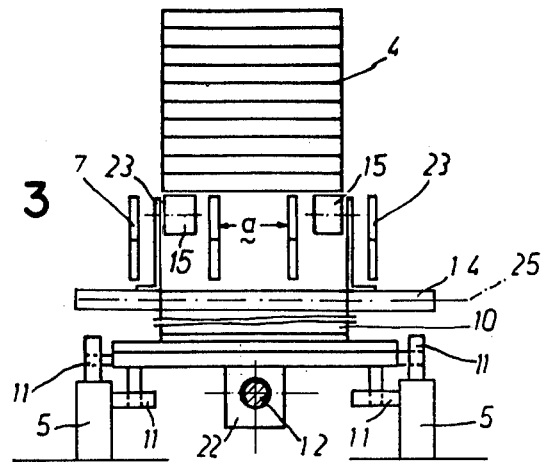
FIG. 3 is a cross-section along the line III—III of the loading and unloading device of FIG. 1 connected to the discharging device of the first machine.

As shown in particular in FIG. 3, the trolley 10 runs on rollers 11 along the rails 5. Advantageously, these rollers 11 are adjustable for consenting the trolley 10 to move along the rails with a minimum play.

The trolley 10 is driven with the threaded rod 12 engaged on a support 22, in turn threaded and integrally fixed to the trolley 10.

The pair of belts 15 is supported by supports 23, integral part of the rotating platform 14, free to enter into the free spaces (a) formed between the arms 7, respectively 9, of the devices 6, 8 for unloading respectively loading and interlinked with the machine 2, respectively 3. Along the circumference of the round platform 14 runs a gear crown 24 engaging a chain 25.

Figure 4:
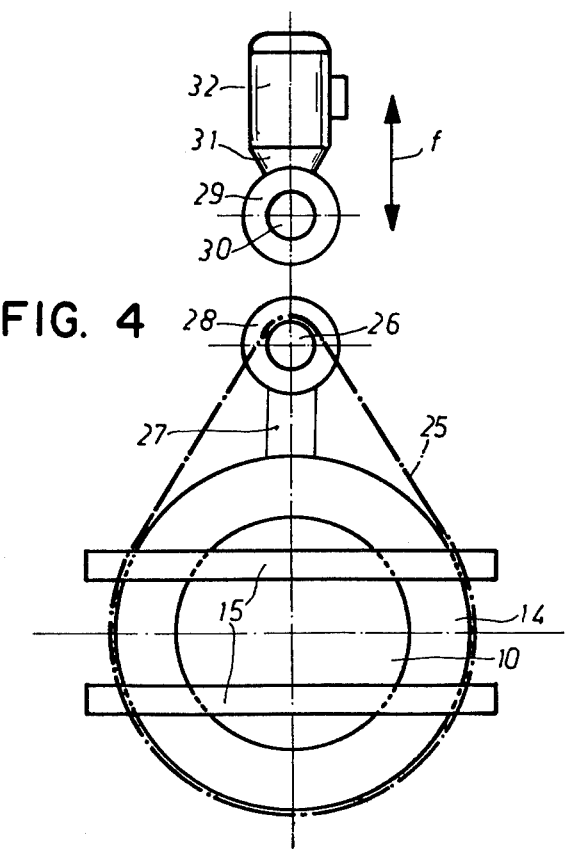
FIG. 4 is a schematical view of the mechanism for applying a rotary movement around a vertical axis to the rotating platform.

As shown in FIG. 4, the said chain 25 engages in addition a gear wheel 26 supported by a support 27 integrally fixed to the trolley 10. Fixed to the gear wheel 26 is a rubber roller 28. This rubber roller 28 can be engaged with a further rubber roller 29, fixed to a shaft 30 driven, for example, by a speed change gear 31 controlled by an electric motor 32. The motor 32 with the speed change gear 31, shaft 30 and rubber wheel 29 is thus supported that it can make a translational movement in the direction indicated by the arrow f.

With the possibility of displacing the driving unit 29–32 it is also possible to contact the runner roller 29 with the rubber roller 28, so that, when driving the motor 32, the motion can be impressed through the roller 28, the gear wheel 26 and the chain 25 to the platform 10, allowing the latter to rotate together with the pair of conveyor belts 15 for positioning the latter either in the position in which the belts 15 are parallel to the rails 5 or in the position in which the conveyor belts 15 are in alignment with the conveyor belts 16, that is turned thro' 90° with respect to the rails 5.

For the driving as well as the control and selection of the movements of the device according to this invention, there are provided limit switches and electric and pneumatic circuits known to those competent in this sector and, therefore, not illustrated and described in detail.

The operation of the device conceived according to this invention is as follows:

When there is formed on the arms 7 of the unloading device 6 of the machine 2 a pile of plates 4 to be removed, the unloading device 1 moves to the left with the pair of belts 15 penetrating into the spaces between the arms 7 (position shown in dots and dashes in FIG. 1).

Consecutively, the arms 7 perform a small movement downward to place the pile of plates 4 onto the belts of the device 1. Thereafter, the device 1 moves from the unloading device 6 to the right feeding the pile of plates 4 to the loading device 8, whose arms 9, after the belts 15 are entered into the free spaces between the arms 9, move slightly upward detaching the pile of plates 4 from the belts 15.

Thereafter, the device 1 returns to its original position.

When it is however intended to discharge the pile of plates 4 between the two machines 2, 3, the device 1 removes as described first the plates 4 from the device 6 interlinked with the machine 2 stopping approximately half-way between the two machines 2,3. At this point, the platform 14 is rotated by the motor 32 through 90°, bringing the ends of the belts 15 into the position shown in FIG. 1 in dots and dashes, that is, perpendicular to the extensions of the guides 5. Driving now together the belts 15 and the belts 16, the pile of plates 4 will be fed from the belts 15 to the belts 16, and can be removed from the latter by means of a loading and unloading trolley introduced between the arms 21 of the U-form frame 18.

If it is desired to load a pile onto the device 1 fed in by the belts 16, the said operations must be reversed.

The lever system 19 as well as the pneumatic piston indicated by the rod 20 consent the belts 16 to make an up and down movement for depositing the pile of plates 4 onto the trolley or remove it from the latter.

Even though the loading and unloading device conceived according to this invention has been described prevailingly for the handling of support plates for the making of printed circuits, it is obviously clear that it may be used also in other sectors of the technique where the use of a similar device consents the automation of the loading and unloading of stacked plate-shaped parts, without thereby leaving the protective limits of this invention.

What I claim is:

1. A first loading and unloading device arranged between two consecutive machines, in which a known unloading device, adjustable in height and interlinked with the outlet of the first working machine and a second known loading device, adjustable in height and interlinked with the inlet of the second working machine, are selectively interconnected by said device which comprises a movable trolley running longitudinally on rails between the two machines with the said trolley rotatingly supporting a horizontal platform carrying in turn a pair of parallel driven conveyor belts which can be interlinked with the unloading device of the first machine and with the loading device of the second machine, and selectively with a vertically adjustable second loading and unloading means positioned between the two machines and spaced laterally from one side of the path of movement of said trolley.

2. A device according to claim 1, in which the distance between the conveyor belts carried by the horizontal platform is chosen so that the said belts can enter into the free spaces formed between the corresponding arms of the unloading or loading devices of the working machines.

3. A device according to claim 1, in which the second loading device and unloading device comprises a further pair of movable conveyor belts arranged perpendicular to rails for said trolley running between the two machines, a U-shaped frame supporting said belts, means to move said belts and means to move said frame vertically to position said further pair of belts in the same horizontal plane as the belts on said platform.

4. A device according to claim 3, in which the trolley supporting the rotating platform runs on adjustable rollers along the rails uniting the two machines.

5. A device according to claim 1, in which a crown wheel is provided around the rotating platform and engages a driving chain.

6. A device according to claim 5 in which the driving chain engages a gear wheel with a rubber roller fixed to the latter, and a further rubber roller engaged thereby, driven by an electric motor.

7. A device according to claim 6, in which the electric motor and relative rubber roller can complete a translational movement to engage or respectively disengage the rubber roller driven by the electric motor with the rubber roller fixed part of the gear wheel engaged by the chain.

8. A device according to claim 1, in which the belts supported by the rotating platform when positioned in alignment with the belts of the loading device and, selectively, of the second, unloading device interposed between the two operating machines, are driven both in synchronism during the loading or unloading phase of a pile of plate-shaped parts.

* * * * *